(12) United States Patent
Seghi

(10) Patent No.: US 10,128,566 B2
(45) Date of Patent: Nov. 13, 2018

(54) ADVANCED RADOME DESIGNS WITH TAILORABLE REINFORCEMENT AND METHODS OF MANUFACTURING THE SAME

(71) Applicant: The United States of America, as represented by the Secretary of the Navy, Washington, DC (US)

(72) Inventor: Steven M. Seghi, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 15/446,691

(22) Filed: Mar. 1, 2017

(65) Prior Publication Data

US 2017/0309996 A1    Oct. 26, 2017

Related U.S. Application Data

(60) Provisional application No. 62/325,015, filed on Apr. 20, 2016.

(51) Int. Cl.
*H01Q 1/28* (2006.01)
*H01Q 1/42* (2006.01)
*G01S 7/02* (2006.01)

(52) U.S. Cl.
CPC ............. *H01Q 1/282* (2013.01); *H01Q 1/427* (2013.01); *G01S 7/02* (2013.01); *G01S 2007/027* (2013.01)

(58) Field of Classification Search
CPC .......... H01Q 1/282; H01Q 1/427; G01S 7/02; G01S 2007/027
USPC .......................................................... 343/705
See application file for complete search history.

(56) References Cited

U.S. PATENT DOCUMENTS 8,378,903 B2 *   2/2013   Baucom ................... H01Q 1/28
                                                     343/705

* cited by examiner

*Primary Examiner* — Andrea Lindgren Baltzell
(74) *Attorney, Agent, or Firm* — Christopher A. Monsey

(57) ABSTRACT

Apparatuses and methods are provided including radome designs with tailorable through thickness reinforcement (TTR) or transverse members that increase mechanical durability of the reinforced radomes against an applied forces while providing desired radar transmissive performance matched to a particular environment. Embodiments provided allow for greater mechanical durability while maintaining sensitive RF performance across the entire structure. TTR in the embodiments include composite rods, fibers, fiber bundles, tows, or a combination of these options. The TTR can be placed through the core or both the skins and the core, and the TTR can be continuous threads of materials.

15 Claims, 15 Drawing Sheets

ADVANCED RADOME DESIGNS WITH TAILORABLE REINFORCEMENT AND METHODS OF MANUFACTURING THE SAME

CROSS-REFERENCE TO RELATED APPLICATIONS

The present application claims priority to U.S. Provisional Patent Application Ser. No. 62/325,015, filed Apr. 20, 2016, entitled "ADVANCED RADOME DESIGNS WITH TAILORABLE REINFORCEMENT AND METHODS OF MANUFACTURING THE SAME," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,358) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention relates to a new radome design with tailorable through thickness reinforcement (TTR) that increases mechanical durability of the reinforced radome against an applied force, as well as methods of making the same.

A number of systems, including radar and antennas, depend on radomes to protect them from aero-loading, handling, and the environment. Radomes have been known in the art for more than a half century. As systems become more sensitive, the effects of the radome become increasingly important to system performance.

In some cases, the balance between mechanical and radio frequency (RF) performance becomes difficult to attain with a robust design that provides long service life. This is the age-old problem that has challenged engineers from the beginning: creating a radome that is transparent to RF electromagnetic (EM) radiation, while at the same time, having the durability to withstand its environment and protect sensitive radar components. As radar capability becomes increasingly needed in harsher environments, such as on aircraft, on ships, in remote locations with severe climates, and extra planetary travel, more robust, durable radomes are needed. To satisfy this need, alternative radome designs must allow for greater mechanical durability while maintaining sensitive RF performance across the entire structure.

Currently, sandwich-structure, composite radome designs have remained essentially unchanged for decades. Honeycomb and foam core construction are used as needed for RF and mechanical performance, but are progressively underperforming due to the greater sensitivity of RF systems and increasing environmental stressors. To solve this problem, this application discloses the incorporation of TTR (which may include monolithic or composite rods, or fibers, fiber bundle, or tows which can be impregnated to yield composite structures, such as pins, that traverse the core of the radome) into foam-core sandwich composites. The incorporation of TTR has been shown to alter the mechanical properties as a function of orientation, density, termination point, and other physical and chemical characteristics of the pins or thread. This approach was investigated and found to be particularly advantageous when applied to radomes. After incorporating TTR with the radome structure, the radome structure was able to bear load beyond the ultimate strength of the material and required significant additional deflection to reach ultimate failure.

According to an illustrative embodiment of the present disclosure, a radome comprising a foam or honeycomb core that is sandwiched between two skins may be reinforced with pins that run through the core, orthogonal to the skins, wherein the pins are comprised of quartz, alumina, or another element or compound with similar characteristics and properties.

According to a further illustrative embodiment, a radome comprising a foam or honeycomb core that is sandwiched between two skins may be reinforced with pins that run through the core, where the pins may be placed at varying angles through the core so as to provide greater durability to external forces, e.g. sheer force, and wherein the pins are comprised of quartz, alumina, aramid, or another element or compound with similar characteristics and properties.

According to a further illustrative embodiment of the present disclosure, a radome comprising a foam or honeycomb core sandwiched between two skins may be reinforced with a thread or fiber/tow, which may or not be one continuous strand, wherein the thread runs through the core and may or may not run through the skins.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
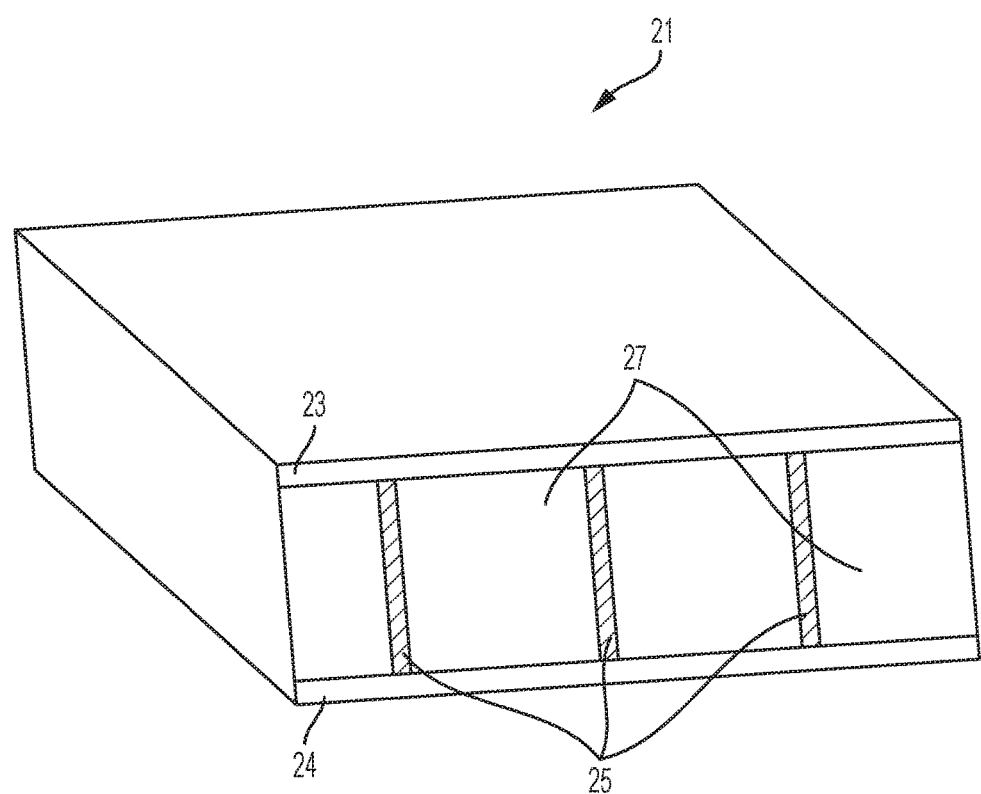
FIG. 1 shows a cross-sectional side view of an exemplary reinforced radome.
Figure 2:
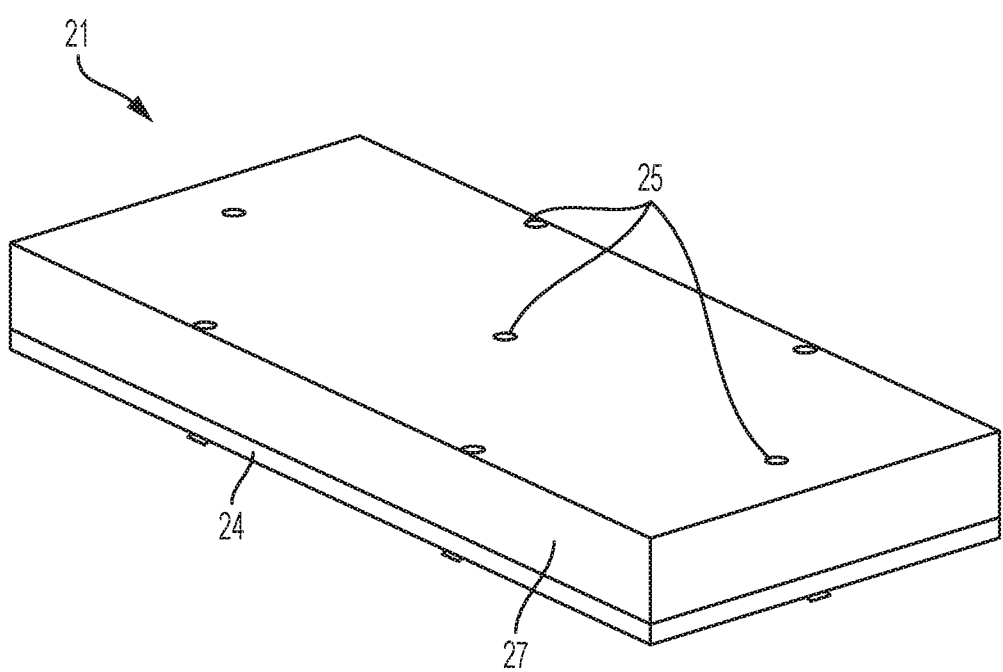
FIG. 2 shows an angled view of an exemplary reinforced radome section with an outer skin removed.

FIG. 1 shows an exemplary embodiment of a reinforced radome 21. This example of the reinforced radome 21 comprises an outer skin 23 and an inner skin 24. A core 27 is disposed between the outer skin 23 and the inner skin 24, which may be a woven wall structure. For example, this may be similar to A-type (three-layer) or C-type (five-layer) radomes. These may be polymer-matrix, composite style radomes, wherein the inner skin 24 and the outer skin 23 comprise composite materials, e.g. cloth weaves, quartz fibers, resins or epoxy. Additionally, the core 27 may be foam based (such as polyurethane, polyvinyl chloride, polymethacrylimide, or polyethylenimine) or honeycomb-based, such that it is strong but has low density. A through thickness reinforcement (TTR) 25 may be disposed through the core 27, orthogonal to the outer skin 23 and the inner skin 24. The TTR 25 may include pins comprising quartz, alumina, or another element or compound with similar characteristics and properties, such as similar dielectric constants. Materials with dielectric constants similar to that of atmosphere work best. The TTR 25 pins may be cylindrical in shape and dispersed throughout the core 27 material in, for example, alternating patterns, such as in FIG. 2. In the exemplary embodiment of FIG. 1, the TTR 25 is disposed through the core 27 but does not penetrate the outer skin 23 and the inner skin 24. Additionally, the TTR 25 may be further secured to the core 27 by use of an adhesive or fasteners. Macroscopically across a radome, the TTR design can change within the radome. For example, density, angle, orientation, different material may vary across the radome structure to maximize mechanical response and durability against its loading environment. For example, RF transparency may be more important in one area of the radome whereas the mechanical requirements are much greater in another area because of the load produced by the environment. A transition section between the two TTR design sections may be needed.

Figure 3:
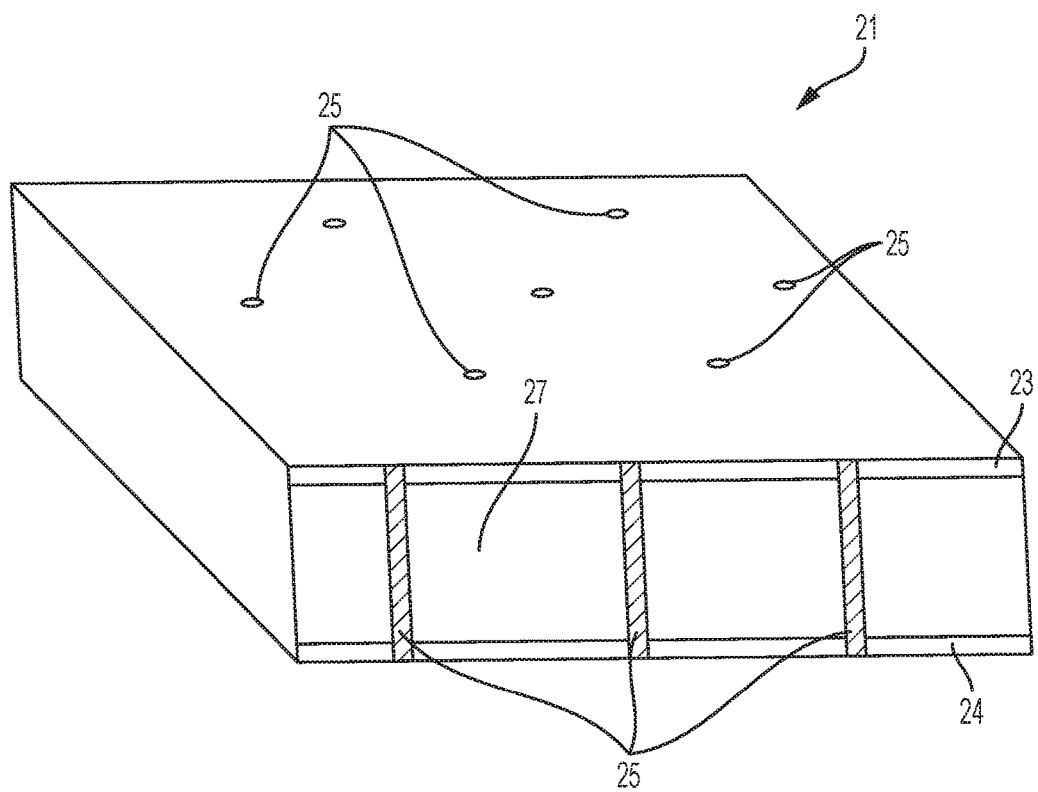
FIG. 3 shows a cross-sectional side view of an exemplary radome section with pins spanning through a core and an inner skin and the outer skin.

Alternatively, FIG. 3 shows an exemplary embodiment of the reinforced radome 21 section, may be comprised of TTR 25 pins that run through the core 27 and, in addition, penetrate the outer skin 23 and the inner skin 24. This embodiment may provide advantages, such as further securing the TTR 25 within the reinforced radome 21.

Figure 4A:
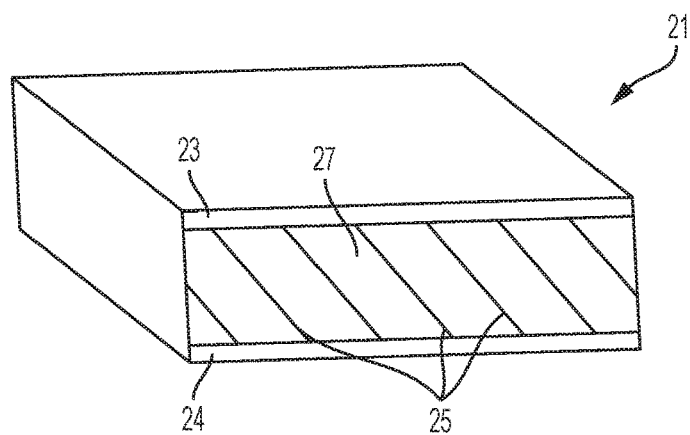
FIG. 4A shows a cross-sectional side view of an exemplary reinforced radome section with an exemplary angled pin orientation.
Figure 4B:
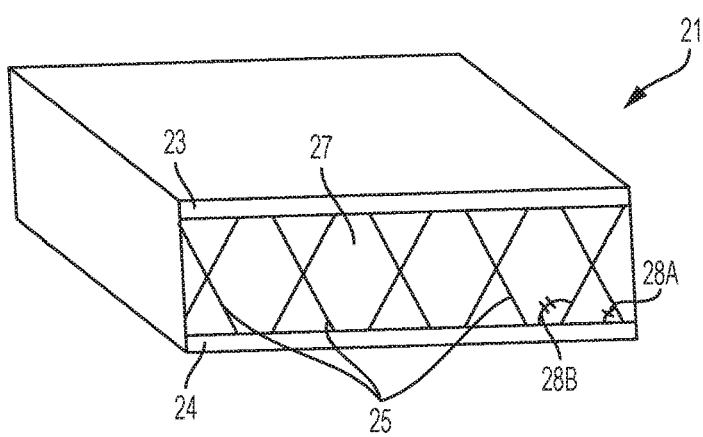
FIG. 4B shows a cross-sectional side view of an exemplary reinforced radome section with an exemplary multi-angled pin orientation.
Figure 4C:
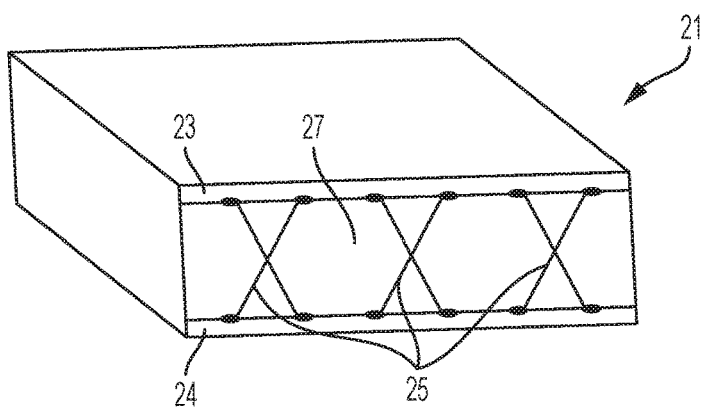
FIG. 4C shows a cross-sectional side view of an exemplary reinforced radome section with an exemplary multi-angled, fastened pin orientation.
Figure 4D:
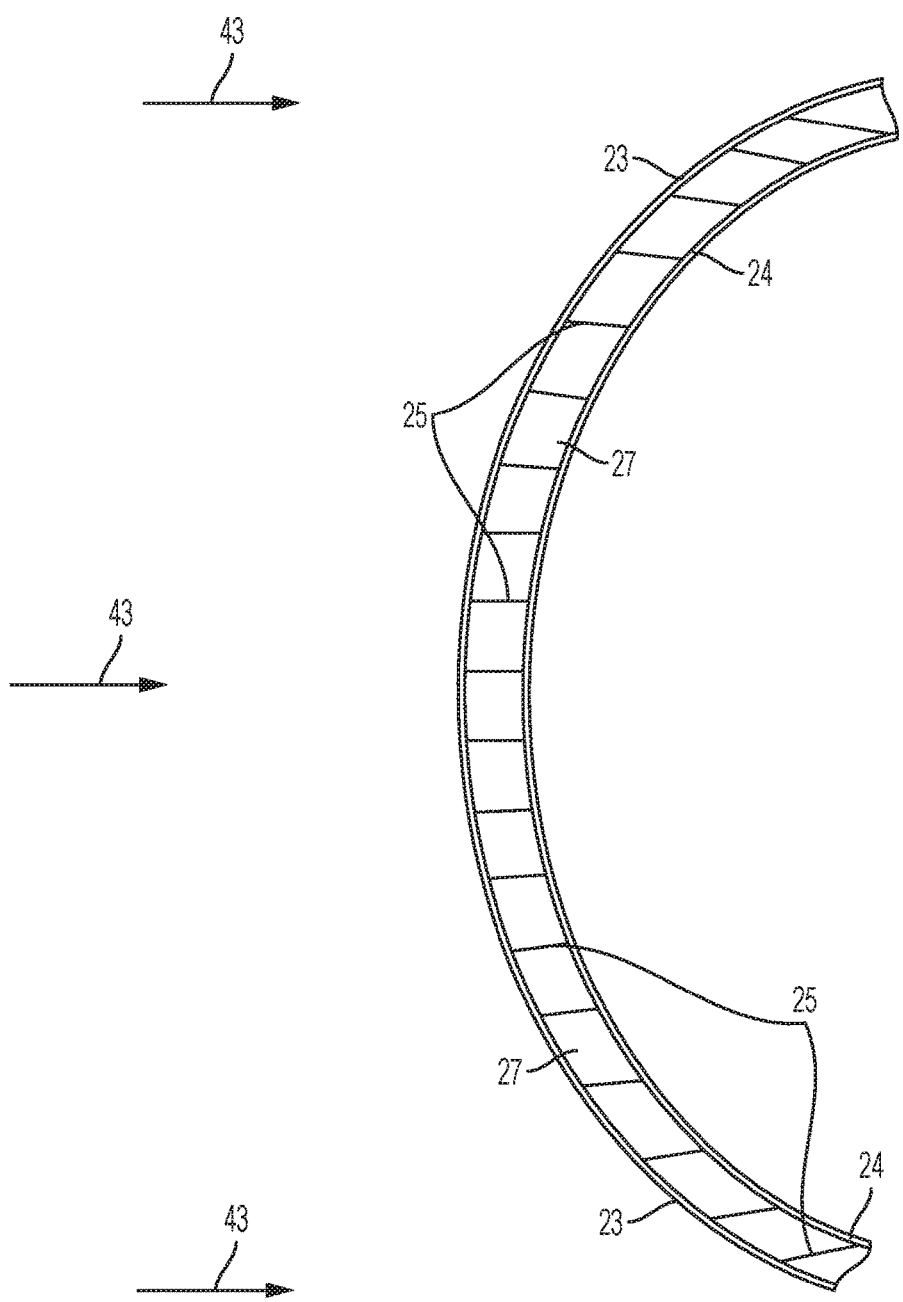
FIG. 4D shows a cross-sectional view of an exemplary reinforced radome section without a core.
Figure 8:
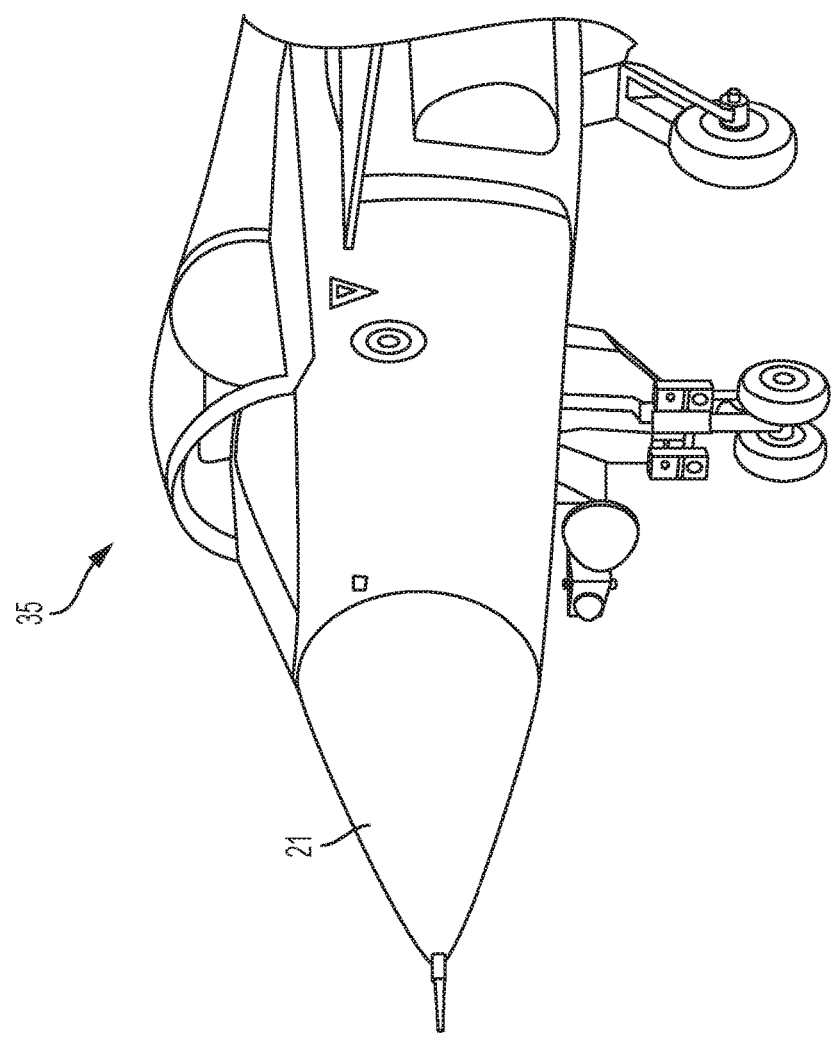
FIG. 8 shows a front, angled view of an aircraft with an exemplary curved, dome-like reinforced radome section as the nose.

Alternative non-orthogonal patterns of TTR 25 pins may run through the core at varying angles. For example, in FIG. 4A, the TTR 25 pins all are disposed along a same angle such that the TTR 25 pins are aligned with the projected trajectory of an attached vehicle (e.g. an aircraft) to resist external forces associated with traveling along the projected trajectory (e.g. air forces acting on the front of an aircraft). Additionally, the TTR 25 may be disposed in patterns containing various angles relative to the outer skin 23 and the inner skin 24. The TTR 25 may be further secured to the core 27 by use of adhesive or a bend or fastener (not shown) to more firmly bond the TTR 25 to the core 27, as shows in FIG. 4C. Angles of the TTR 25 may be selected depending on what type of stress or force will be applied to the reinforced radome 21 when exposed to harsh conditions. For example, if shear force is applied to the reinforced radome 21, TTR 25 disposed in various angles throughout the core 27, such as in FIG. 4B, may be preferred. For example, angles of TTR 25 can be selected to provide maximized reinforcing capacity with respect to force loading from an impact vector to a radome section. In one example, orientation of an exemplary TTR 25 can be selected to reinforce against a predominate impact vector that is oriented towards a larger strike surface to the impact source vector vs another impact source which is more tangential in nature. (e.g., a glancing blow due to an impact vector that has a lower angle). In one example, TTR 25 can be disposed so it is parallel with a selected impact vector such as a shear force which impinges on the radome from a vector which is from a side of an aircraft path of travel (e.g. rain or hail falling from sky). Additionally, curved reinforced radome 21 structures, such as a plane 35 nose, shown in FIG. 8, may have various angled TTR 25 relative to the outer skin 23 and the inner skin 24, as shown in FIG. 4D, with the goal of minimizing area presented to a direction of RF propagation while maximizing the degradation cause by an applied force 43. Exemplary factors impacting design including orientation of TTR 25 can include weather conditions (i.e. rain or hail) that can add additional shear forces which are not resisted by radomes lacking reinforcement. Exemplary orientation of an exemplary TTR 25 within the core 27 can be specifically designed to optimally prevent degradation and erosion of the radome from its loading environment and provide maximized mechanical stability for a particular environment. However, at non-orthogonal angles of radome elements, including TTRs 25, greater interference may occur with radio frequency (RF) radiation. RF transparency can be especially important in situations where an antenna is attempting to detect low power RF signals. Thus, exemplary reinforced radome 21 structure can be manufactured with optional mechanical performance and RF sensitivity, depending on the reinforced radomes 21 environment in which it will be placed, desired aerodynamic/RF properties of a given radome, required performance of a given radar or RF system enclosed in the reinforced radome 21, and alignment of reinforcing structures such as, e.g., TTRs 25.

Figure 4E:
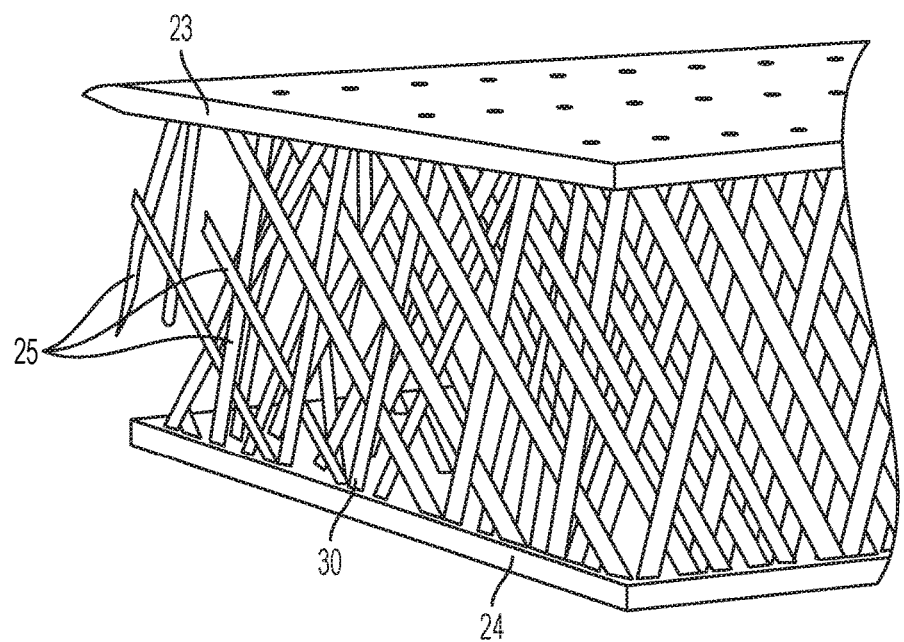
FIG. 4E shows another exemplary reinforced radome.

Referring now to FIG. 4E, which shows another exemplary reinforced radome 21 embodiment. In this embodiment, TTR 25 pins or threads can couple to the outer skin 23 and inner skin 24 at junction points 30. The TTR 25 at the junctions can resemble a tripod pattern with TTR extending in three different directions. This pattern can be repeated throughout the core to create a system of crossing TTR. In this embodiment, the core 27, as shown in FIG. 1, may be absent. Thus, this embodiment may comprise the outer skin 23 and the inner skin 24, wherein the TTR 25 pins or threads are disposed between the outer skin 23 and the inner skin 24 and the TTR 25 may be secured to both the outer skin 23 and the inner skin 24, such as in FIG. 4B or 4C. The core may be subsequently removed after the TTR has been secure, leaving the outer skin and the inner skin secured by the TTR and having air where the core was removed.

Figure 5A:
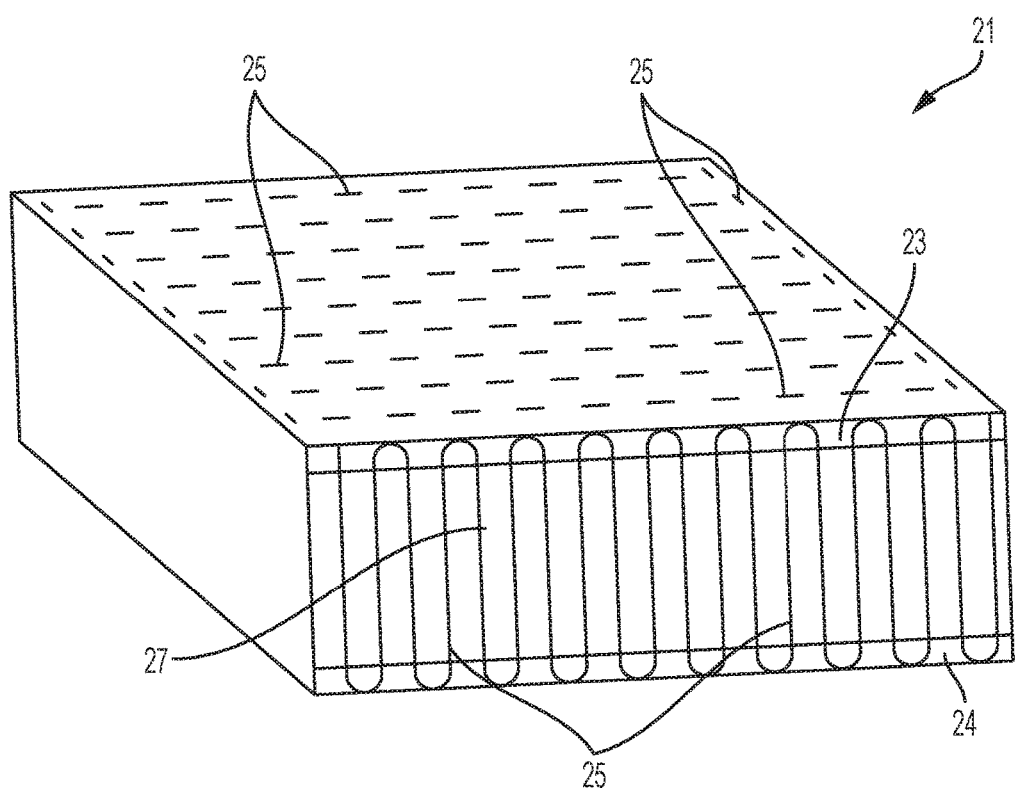
FIG. 5A shows a cross-sectional side view of an exemplary reinforced radome section with a continuous thread running through the core, the outer skin, and the inner skin.
Figure 5B:
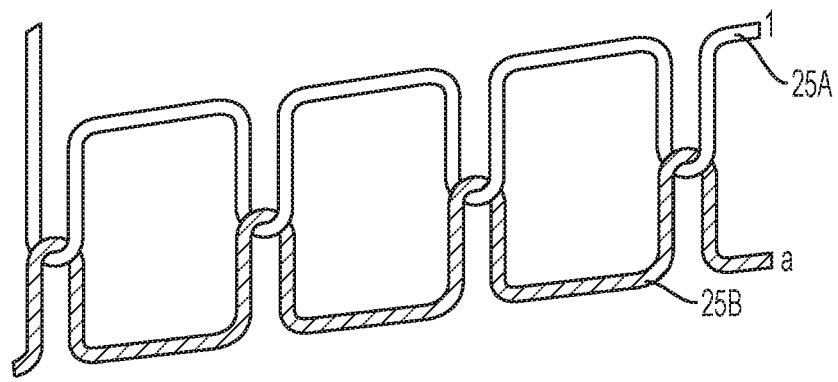
FIG. 5B shows an exemplary embodiment of a potential stich pattern using a plurality of through thickness reinforcement (TTR)
Figure 5C:
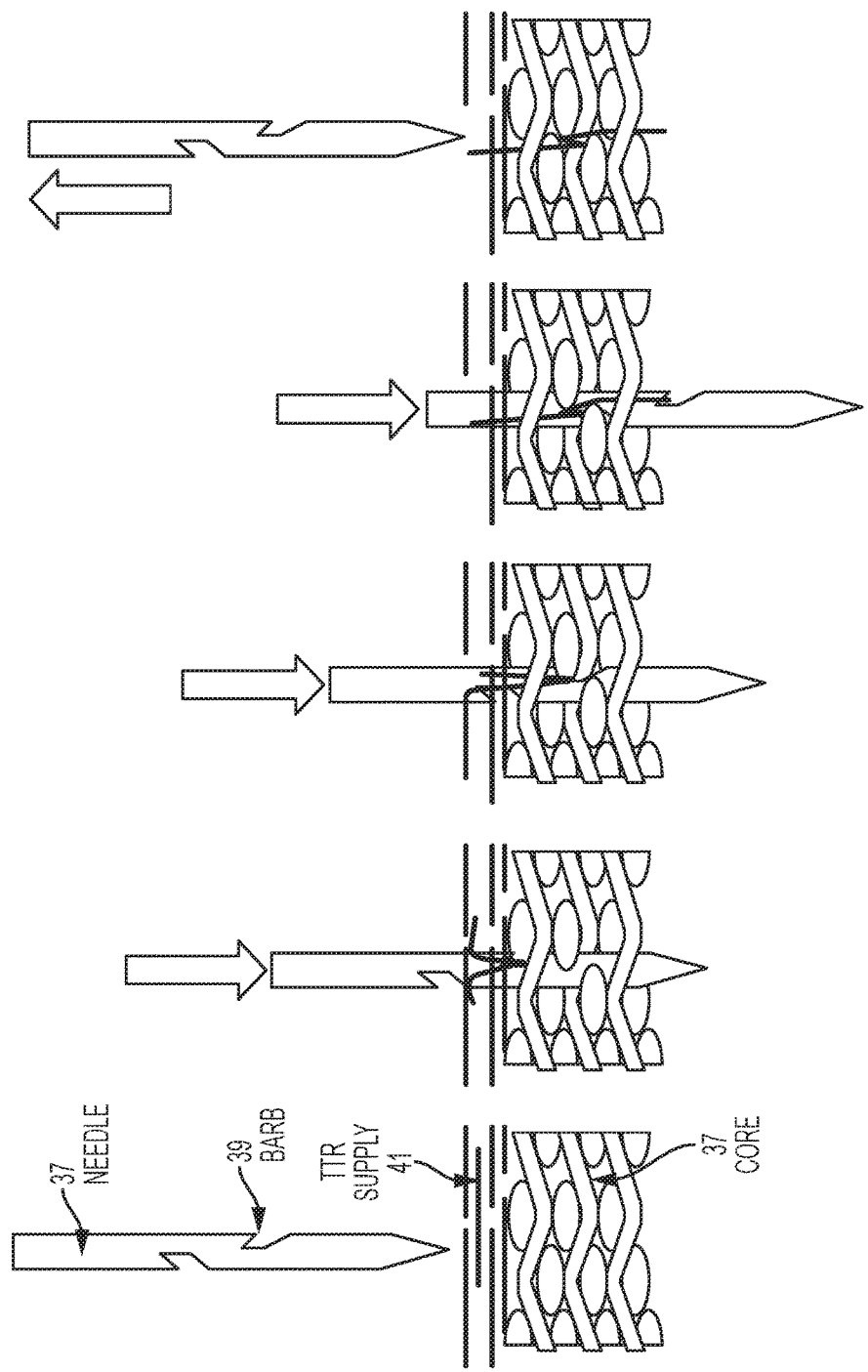
FIG. 5C shows an exemplary insertion method.

FIG. 5A shows an alternative embodiment of the reinforced radome 21. In this exemplary embodiment, the TTR 25 used to increase mechanical durability may be thread. The TTR 25 thread may be one continuous thread disposed throughout the reinforced radome 21 structure, as shown in FIG. 5A, or it may be multiple discontinuous threads. FIG. 5A shows an exemplary embodiment where the TTR 25 thread is disposed within the core 27, and wherein the TTR 25 thread penetrates the outer skin 23 and the inner skin 24. This embodiment provides advantages in that the TTR 25 threads' diameter is smaller than the TTR 25 pins. Because diameter is smaller, less interference with RF occurs, thus increasing the reinforced radomes 21 transparency to RF radiation. Additional advantages occur because greater volume of TTR 25 per square inch of material and stronger interlocking with the outer skin 23 and the inner skin 24. This further secures the TTR 25 within the core 27 to decrease the likelihood of ultimate failure. FIG. 5B depicts and exemplary embodiment of a potential stich pattern using a plurality of TTR, a top thread 25A and a bottom thread 25B. FIG. 5C depicts an exemplary insertion method, using a needle 37 with a barb 39 and a TTR supply 41, wherein the needle 37 inserts the TTR supply, such as a fiber or a tow, in the core and the layers of composite material that will form the skins.

Figure 6:
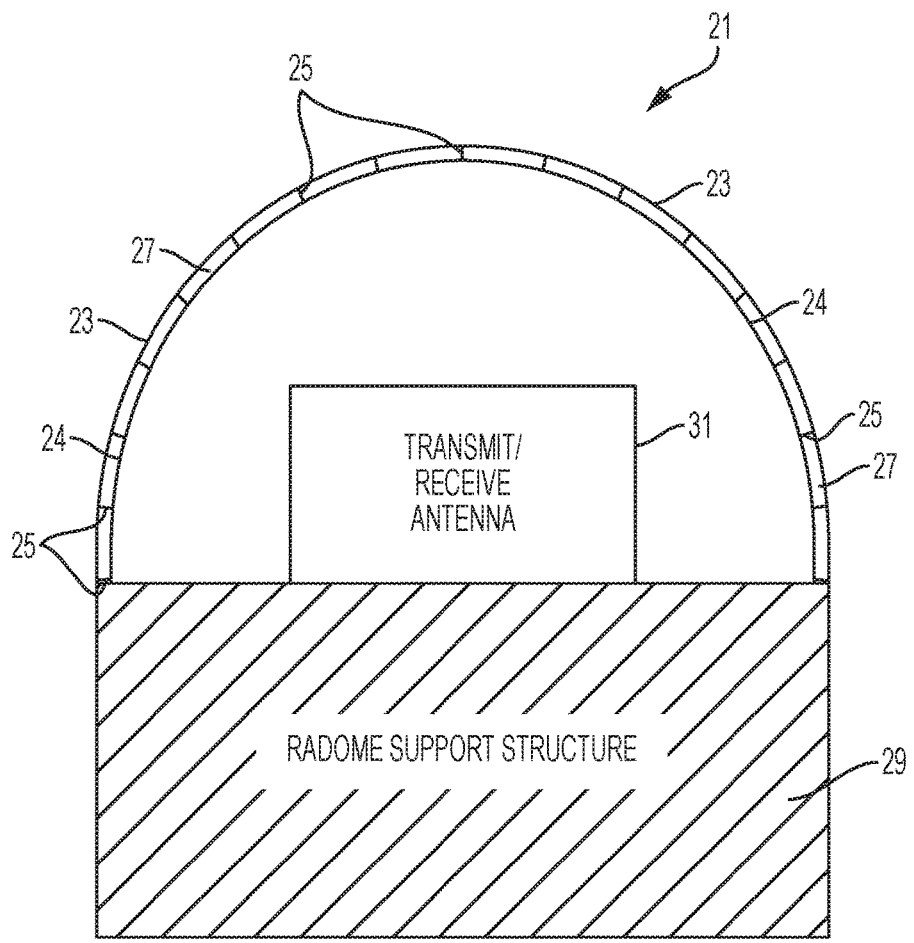
FIG. 6 shows a cross-sectional side view of an exemplary reinforced radome atop a radome support structure.
Figure 7:
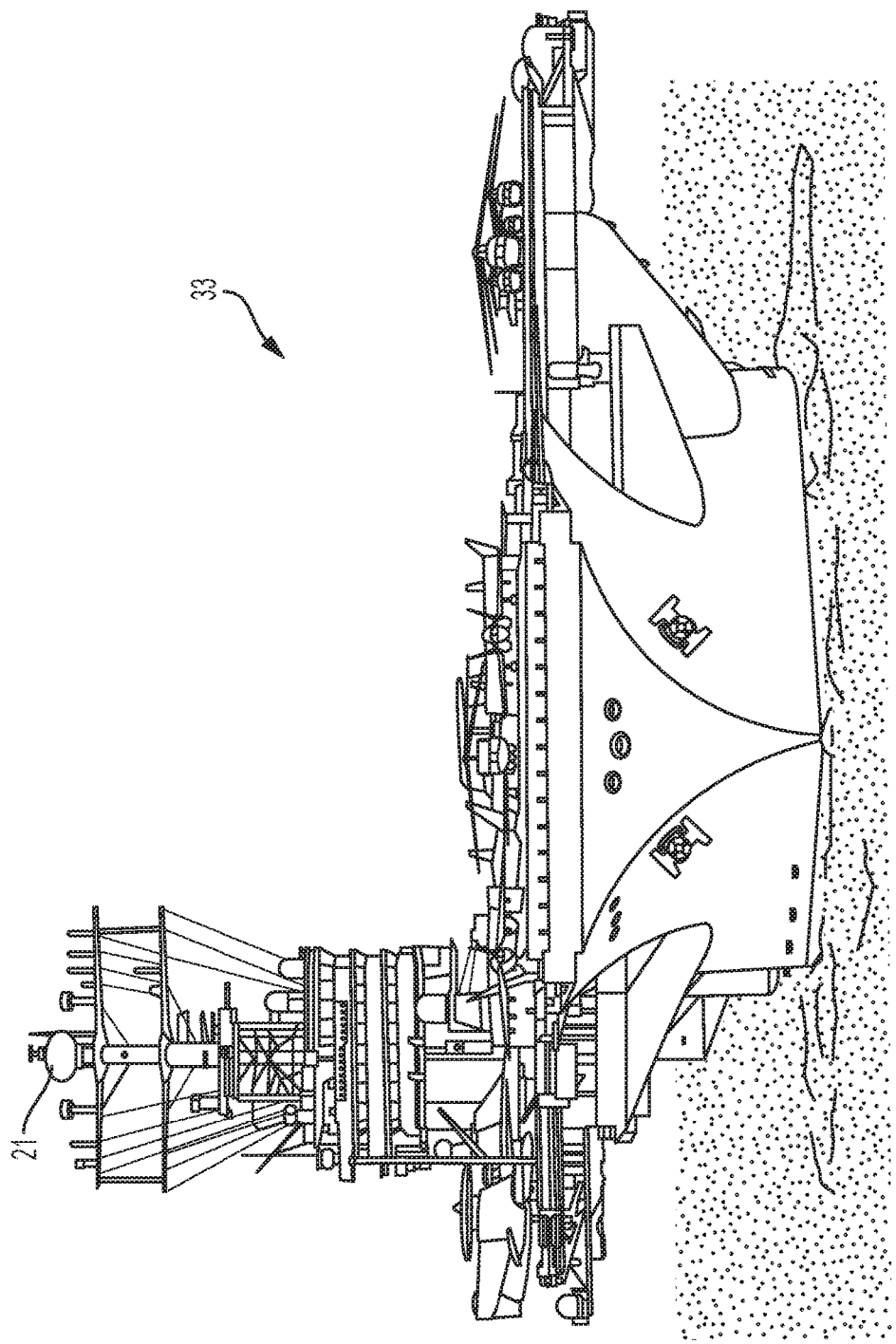
FIG. 7 shows a front view of an exemplary ship with a reinforced radome secured.

FIG. 6 shows an exemplary reinforced radome 21 structure sitting atop a radome support structure 29. The reinforced radome 21 structure, as shown, may protect a transmit and/or receive antenna 31. The outer skin 23 may be exposed to external element and harsh conditions, see for example FIG. 7 where the reinforced radome 21 is atop a ship 33 or for example FIG. 8 where the reinforced radome 21 is secured to a nose cone on the plane 35. Referring back to FIG. 6, the core 27 may be disposed between the outer skin 23 and the inner skin 24. The TTR 25 may be disposed within the core 27, for example, in FIG. 6, perpendicular to, or orthogonal to, the outer skin 23 and the inner skin 24. The TTR 25 may also be disposed with the core 27 at some other angles, chosen to maximize mechanical response to its loading environment, and/or to provide minimum interaction with the RF radiation.

Alternative exemplary embodiments can include radomes similar to methods shown in previous figures (e.g. FIGS. 1, 3, and 5A), wherein exemplary TTR includes a combination of both rigid composite structures (e.g. pins) and flexible structures (e.g. fibers, fiber bundles, and tows).

Figure 9A:
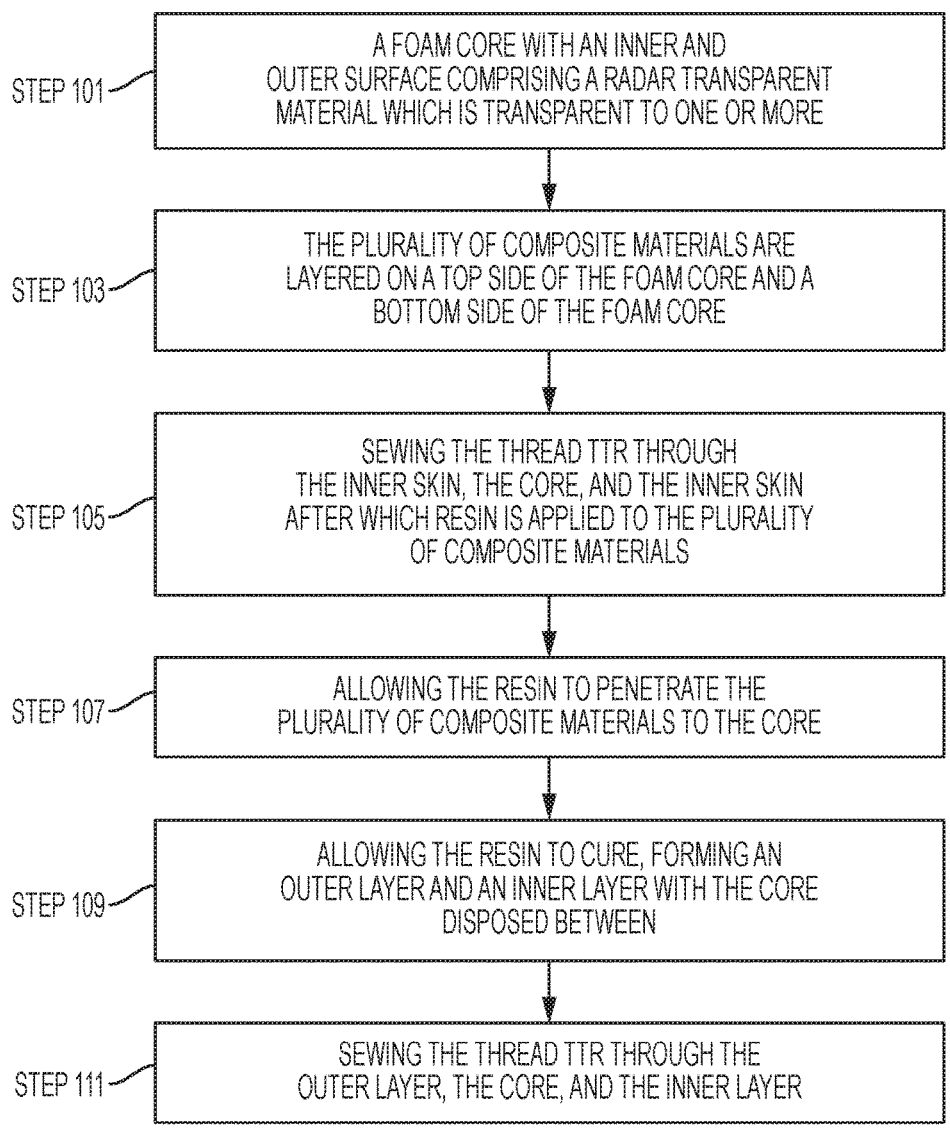
FIGS. 9A and 9B show an exemplary method of manufacturing the reinforced radome.

FIG. 9A represents an exemplary method of manufacturing the reinforced radome 21, for example, the section shown in FIG. 5A. First, at step 101, a foam core with an inner and outer surface comprising a radar transparent material which is transparent to one or more predetermined electromagnetic signals that are passed through the radome, a plurality of layers of composite material, a resin, and a thread TTR are provided. Next, at step 103, the plurality of composite materials are layered on a top side of the foam core and a bottom side of the foam core. Then at step 105, sewing the thread TTR through the inner skin, the core, and the inner skin after which resin is applied to the plurality of composite materials. Next, at step 107, allowing the resin to penetrate the plurality of composite materials to the core. Next, at step 109, allowing the resin to cure, forming an outer skin and an inner skin with the core disposed between. Then at step 111, sewing the TTR thread through the inner skin, the core, and the inner skin.

Figure 9B:
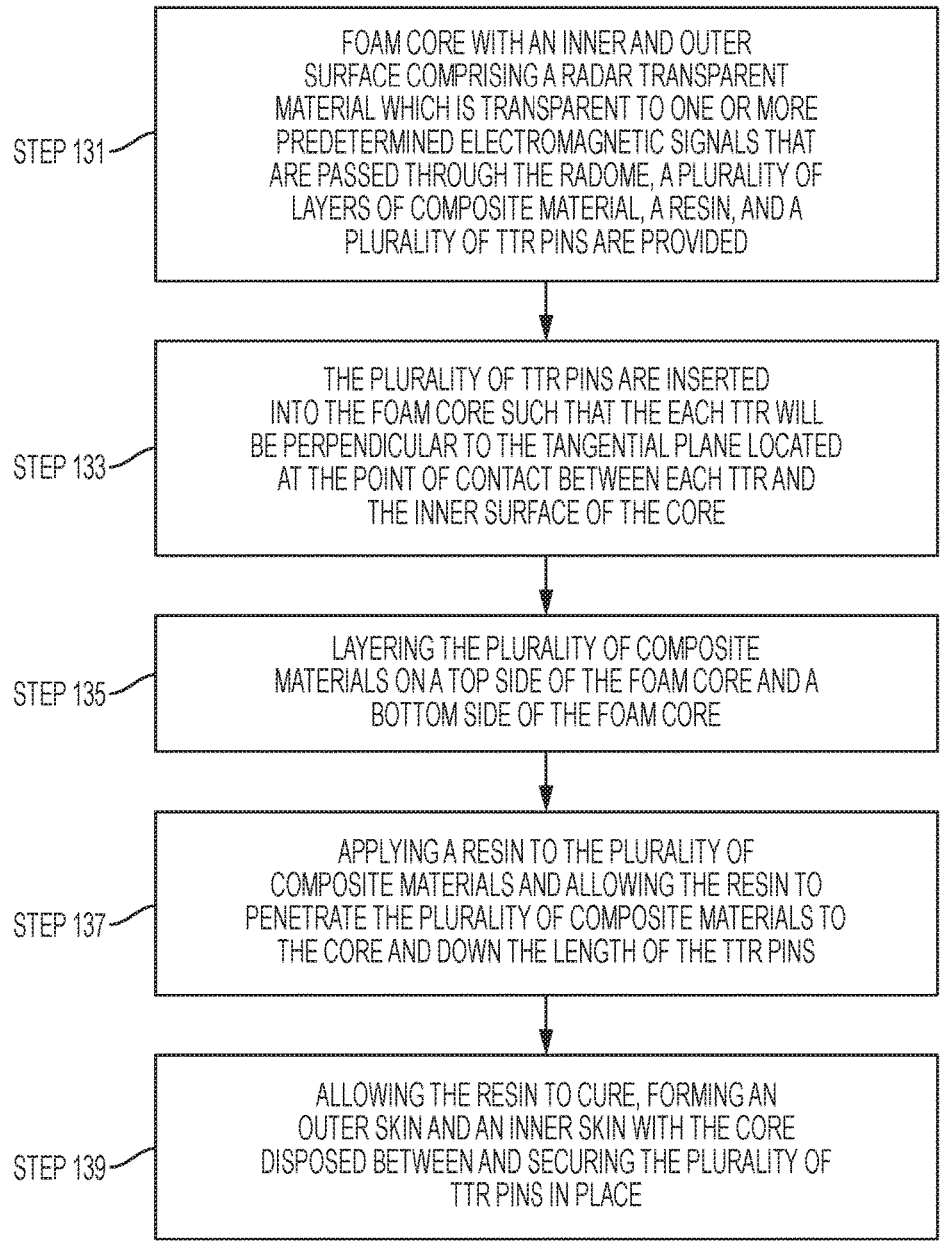

FIG. 9B represents an exemplary method of manufacturing the reinforced radome 21. At step 131, foam core with an inner and outer surface comprising a radar transparent material which is transparent to one or more predetermined electromagnetic signals that are passed through the radome, a plurality of layers of composite material, a resin, and a plurality of TTR pins are provided. At step 133, the plurality of TTR pins are inserted into the foam core such that the each TTR will be perpendicular to the tangential plane located at the point of contact between each TTR and the inner surface of the core. At step 135, layering the plurality of composite materials on a top side of the foam core and a bottom side of the foam core. Then, at step 137, applying a resin to the plurality of composite materials and allowing the resin to penetrate the plurality of composite materials to the core and down the length of the TTR pins. Next, allowing the resin to cure, forming an outer skin and an inner skin with the core disposed between and securing the plurality of TTR pins in place.

Figure 10:
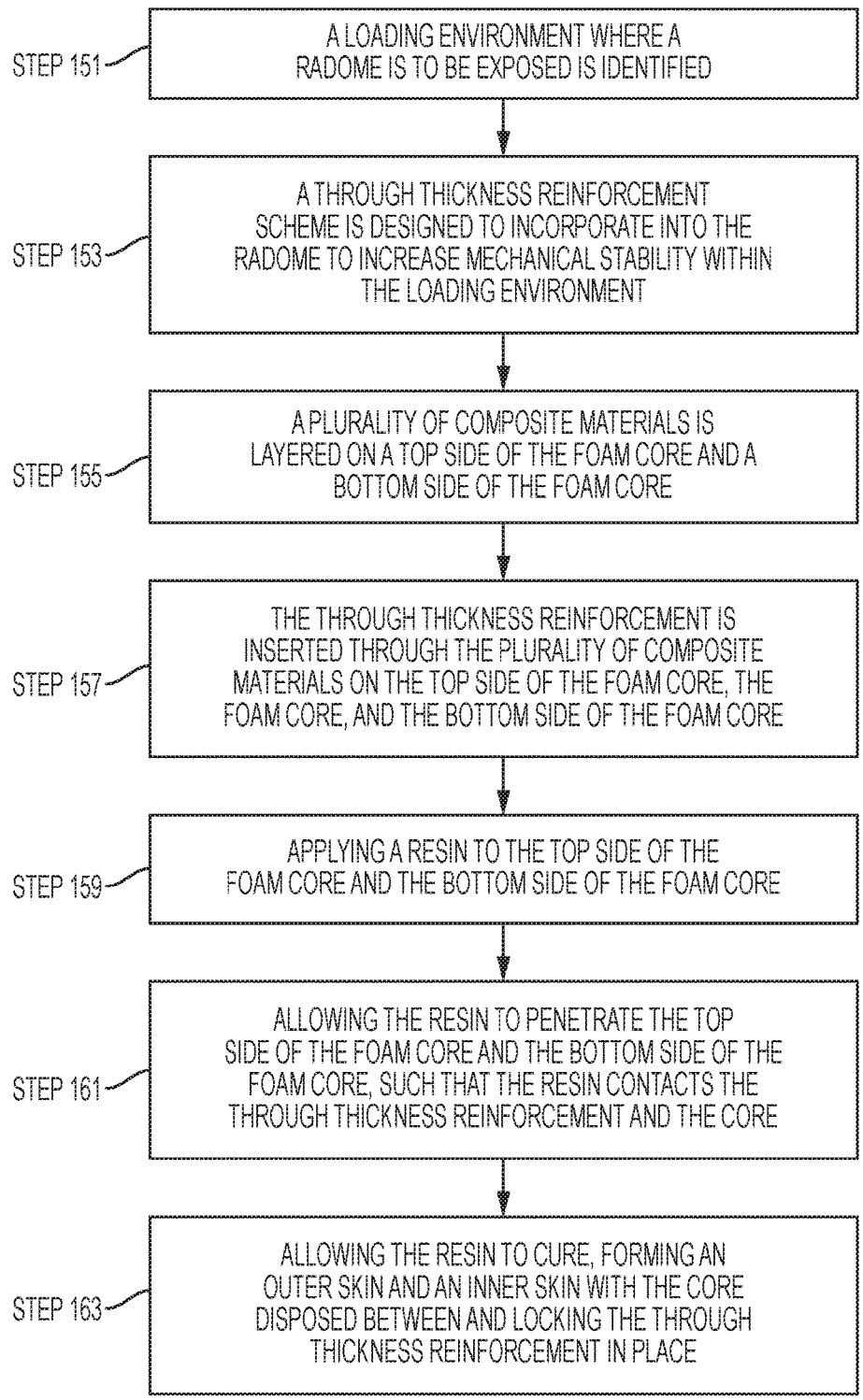
FIG. 10 shows an exemplary method of manufacturing the reinforced radome.

FIG. 10 represents an exemplary method of manufacturing the reinforced radome. First at step 151, a loading environment where a radome is to be exposed is identified. At step 153, a through thickness reinforcement scheme is designed to incorporate into the radome to increase mechanical stability within the loading environment. This step can include determining which external forces are typically expected to impact the radome within the loading environment so that TTR can be inserted such that the TTR is aligned with impact vectors of the external forces. In addition, the TTR scheme can include positioning TTR such that the TTR is aligned with the projected trajectory of an attached vehicle. At step 155, a plurality of composite materials is layered on a top side of the foam core and a bottom side of the foam core, followed by step 157 where the through thickness reinforcement is inserted through the plurality of composite materials on the top side of the foam core, the foam core, and the bottom side of the foam core. At step 159, a resin is applied to the top side of the foam core and the bottom side of the foam core, whereby at step 161 the resin is allowed to penetrate the top side of the foam core and the bottom side of the foam core, such that the resin contacts the through thickness reinforcement and the core. Then at step 163. the resin is allowed to cure, forming an outer skin and an inner skin with the core disposed between and locking the through thickness reinforcement in place.

Alternative exemplary methods include methods similar to methods shown in previous figures (e.g. FIGS. 9A, 9B, and 10), wherein the TTR includes a combination of both rigid composite structures (e.g. pins) and flexible structures (e.g. fibers, fiber bundles, and tows).

Although the invention has been described in detail with reference to certain preferred embodiments, variations and modifications exist within the spirit and scope of the invention as described and defined in the following claims.

The invention claimed is:
1. A reinforced radome comprising:
a core comprising a radar transparent material which is transparent to one or more predetermined electromagnetic signals that are passed through the radome;
an inner layer and an outer layer, wherein the core is disposed between and coupled with the inner layer and the outer layer such that the surface of the core is in contact with the interior surfaces of the inner layer and the outer layer at a first and second mating surface, respectively; and
a plurality of transverse members (TM) comprising a material which is transparent to the one or more predetermined electromagnetic signals that are passed through the radome, wherein each TM has an axis connecting a first and second end of the TM that are each coupled with the inner and outer layer, respectively;

wherein the radome is adapted to couple with a fuselage section of an aircraft such that edges of the radome form a wall, the wall defining an aperture to a cavity within the radome, the edges further define a first plane and shape corresponding to a boundary between the radome and a radome mounting section of the fuselage;

wherein the plurality of TMs is disposed within the core such that the first and second end of each TM couples with the first and second mating surfaces, respectively;

wherein the axis of each TM is perpendicular to a tangential plane located at the point of contact between that TM and the first mating surface.

2. The reinforced radome of claim 1, the plurality of TMs further comprising elongated rigid support structures.

3. The reinforced radome of claim 1, the plurality of TMs further comprising flexible support threads.

4. A reinforced radome comprising:

a core comprising a radar transparent material which is transparent to one or more predetermined electromagnetic signals that are passed through the radome;

an inner layer and an outer layer, wherein the core is disposed between and coupled with the inner layer and the outer layer such that the surface of the core is in contact with the interior surfaces of the inner layer and the outer layer at a first and second mating surface, respectively; and a plurality of transverse members (TM) comprising a material which is transparent to the one or more predetermined electromagnetic signals that are passed through the radome, wherein each TM has an axis connecting a first and second end of the TM that are each coupled with the inner and outer layer, respectively;

wherein the radome is adapted to couple with a fuselage section of an aircraft such that edges of the radome form a wall, the wall defining an aperture to a cavity within the radome, the edges further define a first plane and shape corresponding to a boundary between the radome and a radome mounting section of the fuselage;

wherein the plurality of TMs is disposed within the core such that the first and second end of each TM couples with the first and second mating surfaces, respectively;

wherein the axis of each TM is perpendicular to the first plane.

5. The reinforced radome of claim 4, the plurality of TMs further comprising elongated rigid support structures.

6. The reinforced radome of claim 4, the plurality of TMs further comprising flexible support threads.

7. A reinforced radome comprising:

a core comprising a radar transparent material which is transparent to one or more predetermined electromagnetic signals that are passed through the radome;

an inner layer and an outer layer, wherein the core is disposed between and coupled with the inner layer and the outer layer such that the surface of the core is in contact with the interior surfaces of the inner layer and the outer layer at a first and second mating surface, respectively; and a first and second plurality of transverse members (TM) comprising a material which is transparent to the one or more predetermined electromagnetic signals that are passed through the radome, wherein each TM has an axis connecting a first and second end of the TM that are each coupled with the inner and outer layer, respectively;

wherein the radome is adapted to couple with a fuselage section of an aircraft such that edges of the radome form a wall, the wall defining an aperture to a cavity within the radome, the edges further define a first plane and shape corresponding to a boundary between the radome and a radome mounting section of the fuselage;

wherein the first and second pluralities of TMs are disposed within the core such that the first and second end of each TM couples with the first and second mating surfaces, respectively, such that each TM of the first plurality of TMs is relationally paired or oriented with respect to one TM of the second plurality of TMs, wherein a middle point of each paired TM of the first plurality of TMs is approximately adjacent to a middle point of a corresponding paired TM of the second plurality of TMs such that each TM pair is disposed in an crossing or X shape;

wherein the axis of each TM of the first plurality of TMs forms a first angle between the TM and the first mating surface, wherein the first angle is less than 90 degrees with respect to a first reference edge of the radome;

wherein the axis of each TM of the second plurality of TMs forms a second angle between the TM and the first mating surface, wherein the second angle is equal to 180 degrees minus the first angle with respect to the first reference edge.

8. The reinforced radome of claim 7, the first and second pluralities of TMs further comprising elongated rigid support structures.

9. The reinforced radome of claim 7, the first and second pluralities of TMs further comprising flexible support threads.

10. A reinforced radome comprising:

a core comprising a radar transparent material which is transparent to one or more predetermined electromagnetic signals that are passed through the radome;

an inner layer and an outer layer, wherein the core is disposed between and coupled with the inner layer and the outer layer such that the surface of the core is in contact with the interior surfaces of the inner layer and the outer layer at a first and second mating surface, respectively; and a first, second, and third plurality of transverse members (TM) comprising a material which is transparent to the one or more predetermined electromagnetic signals that are passed through the radome, wherein each TM has an axis connecting a first and second end of the TM that are each coupled with the inner and outer layer, respectively, wherein the first plurality of TMs is oriented in a first direction, the second plurality of TMs is oriented in a second direction, and the third plurality of TMs is oriented in a third direction;

wherein the radome is adapted to couple with a fuselage section of an aircraft such that edges of the radome form a wall, the wall defining an aperture to a cavity within the radome, the edges further define a first plane and shape corresponding to a boundary between the radome and a radome mounting section of the fuselage;

wherein the first, second, and third pluralities of TMs are disposed within the core such that the first and second end of each TM couples with the first and second mating surfaces, respectively, at a plurality of first and second junction points such that one TM of the first, second, and third pluralities couples to each first junction and to each second junction.

11. The reinforced radome of claim 10, the first, second, and third pluralities of TMs further comprising elongated rigid support structures.

12. The reinforced radome of claim 10, the first, second, and third pluralities of TMs further comprising flexible support threads.

13. A reinforced radome comprising:
a core comprising a radar transparent material which is transparent to one or more predetermined electromagnetic signals that are passed through the radome;
an inner layer and an outer layer, wherein the core is disposed between and coupled with the inner layer and the outer layer such that the surface of the core is in contact with the interior surfaces of the inner layer and the outer layer at a first and second mating surface, respectively;
a first, second, and third plurality of transverse members (TM) comprising elongated rigid support structures and flexible support threads made of a material which is transparent to the one or more predetermined electromagnetic signals that are passed through the radome, wherein each TM has an axis connecting a first and second end of the TM that are each coupled with the inner and outer layer, respectively, wherein the first plurality of TMs is oriented in a first direction, the second plurality of TMs is oriented in a second direction, and the third plurality of TMs is oriented in a third direction; and
a fourth, fifth, sixth, and seventh plurality of TM comprising elongated rigid support structures and flexible support threads made of a material which is transparent to the one or more predetermined electromagnetic signals that are passed through the radome, wherein each TM has an axis connecting a first and second end of the TM that are each coupled with the inner and outer layer, respectively;
wherein the radome is adapted to couple with a fuselage section of an aircraft such that edges of the radome form a wall, the wall defining an aperture to a cavity within the radome, the edges further define a first plane and shape corresponding to a boundary between the radome and a radome mounting section of the fuselage;
wherein the first, second, and third pluralities of TM are disposed within the core such that the first and second end of each TM couples with the first and second mating surfaces, respectively, at a plurality of first and second junction points such that one TM of the first, second, and third pluralities couples to each first junction and to each second junction;
wherein the fourth and fifth pluralities of TMs are disposed within the core such that the first and second end of each TM couples with the first and second mating surfaces, respectively;
wherein the axis of each TM of the fourth plurality of TMs is perpendicular to a tangential plane located at the point of contact between that TM and the first mating surface;
wherein the axis of each TM of the fifth plurality of TMs is perpendicular to the first plane;
wherein the sixth and seventh pluralities of TMs are disposed within the core such that the first and second end of each TM couples with the first and second mating surfaces, respectively, such that each TM of the sixth plurality of TMs is relationally paired or oriented with respect to one TM of the seventh plurality of TMs,
wherein a middle point of each paired TM of the sixth plurality of TMs is approximately adjacent to a middle point of a corresponding paired TM of the seventh plurality of TMs such that each TM pair is disposed in an crossing or X shape;
wherein the axis of each TM of the sixth plurality of TMs forms a first angle between the TM and the first mating surface, wherein the first angle is less than 90 degrees with respect to a first reference edge of the radome;
wherein the axis of each TM of the seventh plurality of TMs forms a second angle between the TM and the first mating surface, wherein the second angle is equal to 180 degrees minus the first angle with respect to the first reference edge.

14. A method of manufacturing a reinforced radome, the method comprising: providing a core with an inner and outer surface comprising a radar transparent material which is transparent to one or more predetermined electromagnetic signals that are passed through the radome, a plurality of layers of composite material, a resin, and a plurality of transverse members (TM), wherein each TM has an axis connecting a first and second end of the TM;
inserting the plurality of TMs into the core such that the axis of each TM is perpendicular to a tangential plane located at the point of contact between that TM and the inner surface of the core;
layering the plurality of composite materials on a top side of the core and a bottom side of the core such that the layers contact the inner surface of the core at a first mating surface and contact the out surface of the core at a second mating surface, wherein the axis of each TM is perpendicular to a tangential plane located at the point of contact between that TM and the first mating surface;
applying a resin to the plurality of composite materials;
allowing the resin to penetrate the plurality of composite materials to the core; and
allowing the resin to cure, forming an outer layer and an inner layer with the core disposed between and securing the plurality of TMs in place.

15. A method of manufacturing a reinforced radome, the method comprising:
providing a core with an inner and outer surface comprising a radar transparent material which is transparent to one or more predetermined electromagnetic signals that are passed through the radome, a plurality of layers of composite material, a resin, and a first and second plurality of transverse member (TM) pins, fibers, fiber bundles, threads, and tows; wherein each TM has an axis connecting a first and second end of the TM;
identifying a loading environment where a radome is to be exposed;
designing a TM scheme to incorporate into the radome to increase mechanical stability within the loading environment by reinforcing against expected predetermined external forces within the loading environment;
inserting the first plurality of TMs into the core such that the axes of the first plurality of TMs are aligned within a predetermined angle of vectors created by the predetermined external forces;
inserting the second plurality of TMs into the core such that the axes of the second plurality of TMs are aligned within a predetermined angle of expected flight path vectors;
layering the plurality of composite materials on a top side of the core and a bottom side of the core such that the layers contact the inner surface of the core at a first mating surface and contact the out surface of the core at a second mating surface;

applying a resin to the plurality of composite materials;

allowing the resin to penetrate the plurality of composite materials to the core; and allowing the resin to cure, forming an outer layer and an inner layer with the core disposed between and securing the plurality of TMs in place.

\* \* \* \* \*